United States Patent

[11] 3,627,090

| [72] | Inventor | Edward Earl Dickey<br>R.R. #6, Brampton, Ontario, Canada |
|---|---|---|
| [21] | Appl. No. | 877,766 |
| [22] | Filed | Nov. 18, 1969 |
| [45] | Patented | Dec. 14, 1971 |
| [32] | Priority | Dec. 21, 1968 |
| [33] | | Canada |
| [31] | | 038,461 |

[54] SECTIONAL REFUSE CHUTE FOR CONSTRUCTION SITES
8 Claims, 3 Drawing Figs.

[52] U.S. Cl. .................................................. 193/34
[51] Int. Cl. ............................................... B65g 11/14,
E04f 17/12
[50] Field of Search .......................................... 193/34, 33, 11

[56] References Cited

UNITED STATES PATENTS

| 565,151 | 8/1896 | Barlow-Massicks | 193/11 X |
| 1,163,508 | 12/1915 | Cockrum | 193/34 X |
| 1,510,288 | 9/1924 | Malone | 193/34 |
| 1,530,787 | 3/1925 | Oberst | 193/34 |
| 1,877,234 | 9/1932 | Gallagher | 193/34 |

*Primary Examiner*—Joseph Wegbreit
*Attorney*—George A. Rolston

ABSTRACT: A sectional sheet metal refuse chute, for use at a building site, which is adapted to be erected along side a building under construction, and incorporating access hatchways at each floor level, and refuse funnel means for each hatchway, at least a part of the funnel means also providing the means of support for the refuse chute, and in which some of the sections are tapered from one end to the other so that they may telescope with other sections to accommodate variations in dimensions of buildings permitting the chute to be reused many times at different sites.

Patented Dec. 14, 1971

INVENTOR
EDWARD E. DICKEY
BY
George A. Rolston
PATENT AGENT

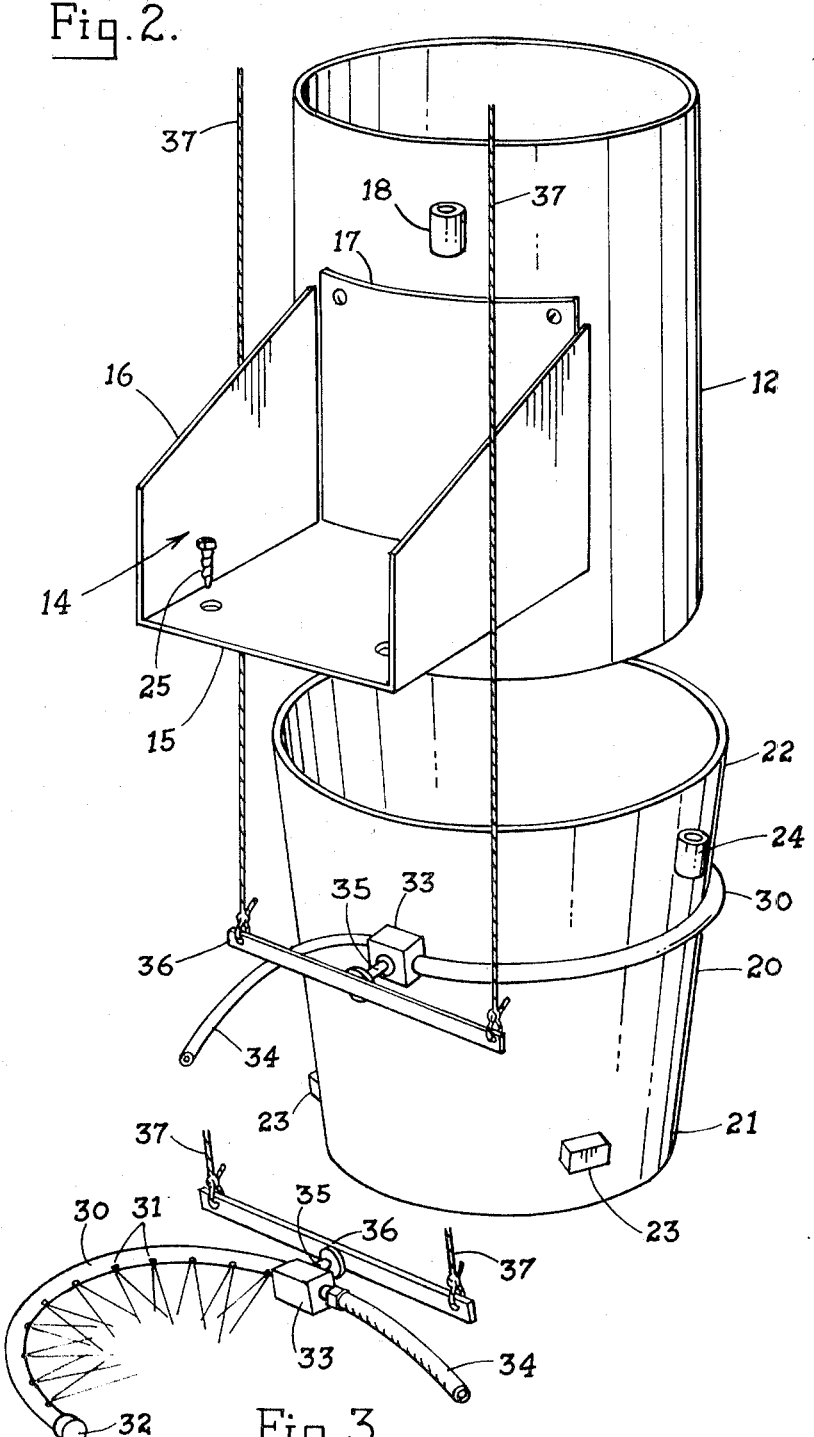

SECTIONAL REFUSE CHUTE FOR CONSTRUCTION SITES

The present invention relates to a refuse chute made up of a number of tubular sections, adapted to be erected at a construction site such as a high rise apartment or office building, for the disposal of construction waste from the different floors of the building during construction.

In the construction of high rise buildings such as offices and apartments and the like, it is the practice to provide a waste disposal chute, erected up the outside wall of the building during its construction, and continuously added to as the building rises, by means of which construction waste materials may be easily and safely disposed of from each floor. Obviously, such waste material cannot b simply thrown to the ground, since the heavier material will be extremely hazardous, and the lighter waste dust cement particles and the like will pollute the atmosphere. In fact, in many areas, modern building regulations require that steps must be taken to eliminate the creation of dust in this manner. Clearly, such waste materials cannot be removed by the existing construction hoists or cranes, since this would tie up valuable pieces of equipment for substantial periods of time on virtually useless work.

In the past, construction refuse chutes of this type have been erected of wood, usually arranged in prefabricated sections so that the chute may be continuously extended upwardly as the building rises. However, such wooden sectional refuse chutes have certain disadvantages in that they are subject to very heavy wear, and if they should be erected and dismantled two or three times at different sites, the means of fastening the sections together rapidly becomes inefficient. As a result, the time taken to erect and dismantle the sections rapidly increases, and the security of the chute itself is impaired.

The present invention seeks to overcome at least some of these disadvantages by the provision of a refuse chute formed of tubular metal sections which are prefabricated in a factory, and which require no special attachment devices for forming them into a continuous tubular chute, and which incorporate a certain degree of adjustment for accommodating differences in spacing between the floors of different buildings, and which incorporate an access hatchway or trap door for each floor through which refuse may be tipped into the chute.

More particularly, it is an objective of the present invention to provide a metal refuse chute having the foregoing advantages and incorporating telescopic sections for each floor of the building thereby permitting the adjustment of the length of the chute to suit the spacing between the floors of the building.

More particularly, it is an objective of the present invention to provide a refuse chute having the foregoing advantages which is additionally provided with means for attaching alternate sections of the chute to parts of the building such as the balconies or the like, thereby providing continuous support all the way up the chute.

More particularly, it is an objective of the present invention to provide a refuse chute having the foregoing advantages which additionally incorporates a water spray system, operable from any one of the floors of the building regardless of the height, so as to damp down the dust deposited in the chute.

More particularly, it is an objective of the present invention to provide a refuse chute having the foregoing advantages and incorporating individual refuse disposal funnels connected to the chute at intervals throughout the length of the chute, and arranged at a convenient height on each floor of the building for disposal of refuse items from each floor.

The foregoing and other objectives will become apparent from the following description of a preferred embodiment of the invention which is given here by way of example only with reference to the following drawings in which like reference devices refer to like parts thereof throughout the various views and diagrams and in which:

FIG. 2 is an exploded perspective view of the chute shown in FIG. 1, and,

FIG. 3 is a sectional illustration of the water spray accessory attachment, shown in isolation, and rotated 180° from the position in which it is shown in FIG. 2.

Figure 1:
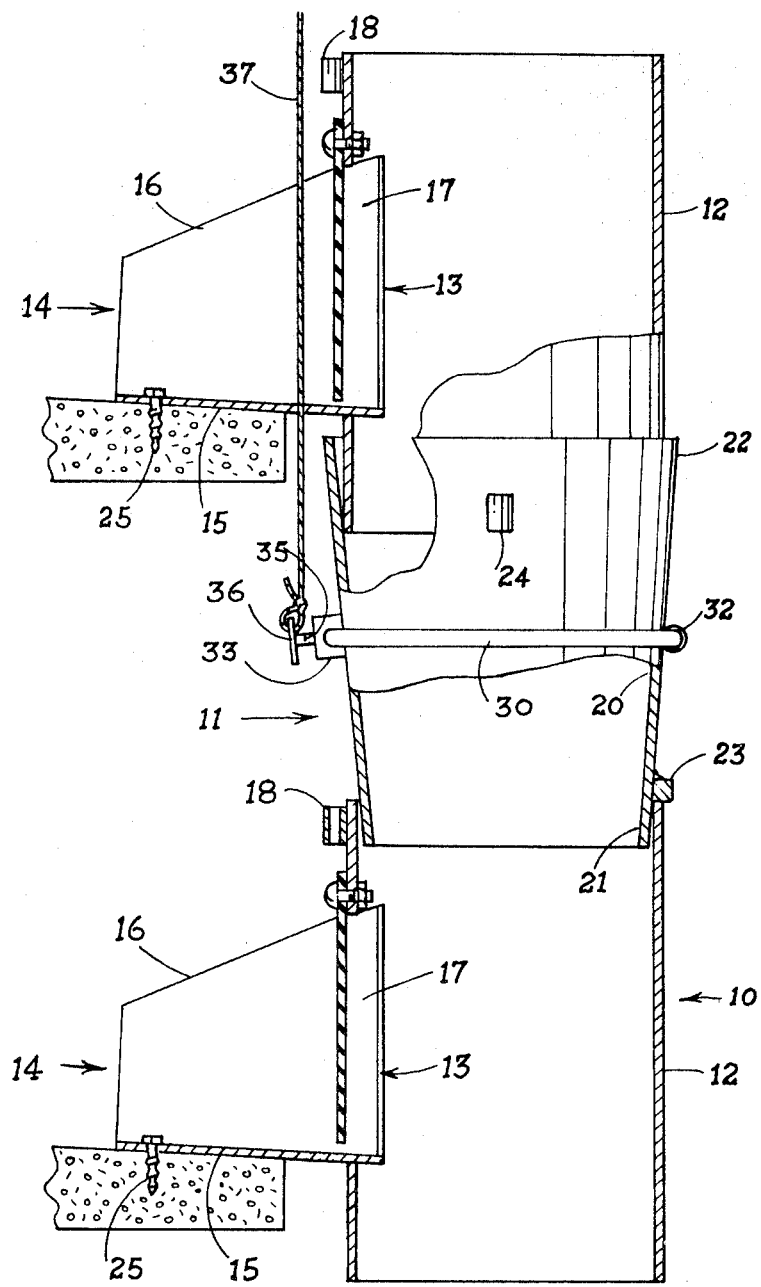
FIG. 1 is a side elevational view, partially in section, showing the sectional refuse chute according to the invention in position on a building.

From the foregoing drawings, it will be noted that the refuse chute according to the invention, in this preferred embodiment, is made up of a series of sections, and that there are two different sections, arranged in an alternate manner. These sections are indicated as the funnel section 10 and the intermediate telescope section 11. The funnel section 10 in this preferred embodiment consists of a generally speaking regular cylindrical tubular metallic member 12 of essentially regular diameter throughout its length, and having a rectangular hatchway 13 cut in one side thereof, and a funnel member 14 having a floor 15 and sidewalls 16 is welded to the exterior of the cylindrical member 12 in registration with openings 13. Preferably, the floor 15 is angled slightly downwardly with respect to the central axis of cylindrical member 12 whereby to funnel refuse thereon by gravity into the chute. In order to block off hatchway 13 and cover it over so as to prevent the escape of refuse and dust which have been tipped into the chute from the floors above, the hatchway 13 is covered with an resilient flexible rubber flap 17 riveted to the exterior of member 12, along the upper edge of hatchway 13. Around the upper end of member 12 two or more lifting hooks 18 are provided, consisting essentially of short lengths of steel tubing welded to the exterior of member 12 by means of which two or more hooks from any suitable hoist (not shown) may be attached to member 12, permitting the same to be hoisted vertically upwardly or lowered into position.

The intermediate telescope section 11, according to this preferred embodiment is formed of the tubular steel member 20 which is formed into a slightly frustoconical shape, tapering more or less evenly from its narrowest point at its lower end 21 to its widest point at its upper end 22. It will be noted that in about the region of its lower end 21, the exterior diameter of member 20 is arranged so as to permit the same to fit within the open upper end of cylindrical member 12, while at its larger upper end 22, the member 20 is formed of such an interior diameter as to permit the lower end of cylindrical member 12 to enter within member 20 and if necessary to telescope therewith for a relatively substantial portion of its length, thereby permitting ready adjustment of the length of the chute to accommodate different spacings between floors of the building. In order to avoid jamming of the intermediate section 20 into the upper end of the cylindrical member 12, three or more abutment members 23 are welded at spaced intervals around the exterior of the lower end 21 of member 20 whereby to abut against the upper end of member 12 and carry the entire weight of member 20 thereon. Lifting hook 24, similar to lifting hooks 18, are welded around the upper end 22 of member 20 for the same purpose.

By means of the sections 10 nd 11, a composite metallic refuse chute can be constructed by interlocking alternate sections as shown end for end, and telescoping the two sections to the appropriate length required. Attachment of the sections 10 and 11 in position on the building is achieved, according to this preferred embodiment, although obviously other means of attachment could be provided, simply by means of arranging that the floor portions 15 of funnels 14 overlie the balcony portions, indicated as B in the illustrations, of the building, and two or more concrete fastening members indicated as 25 are punched through the floor portions 15 and into the concrete of the balcony portions B by means such as an explosively actuated hammer or the like.

In order to provide a water spray, operable from all levels of the building, to damp down the dust in the chute, there is provided a metallic tubular water distribution conduit 30 formed into a semicircular shape, corresponding to the exterior diameter of a section 10 or 11, and provided with a series of water jet openings 31 located and oriented to register with suitable jet passageways (not shown) drilled in the sheet metal sidewalls of such member 10 or 11. One end of the conduit 30 is closed by means of a threaded removable end cap 32, and the other end of the conduit 30 is provided with a control valve 33 connected to a source of water supply by means such as hose 34. An operating shaft 35 extends from valve 33 and on its free end it is provided with an operating bar 36. At each end of bar 36 there is provided a pull string 37 and each of strings 37 run up the entire height of the building on either side of the chute, being available for operation adjacent each of funnels 14. Preferably, the conduit member 30 is arranged around one of sections 10 or 11 adjacent to the lower levels of the building somewhere between the second and fourth floor in the normal cases, and a workman who is dumping refuse into the chute from one of the upper floors will be able to operate valve 33 merely by pulling one of strings 37. After the water has flushed into the chute for a suitable period of time the workman merely pulls the other string to switch it off. The end cap 32 is removable to permit flushing out of the tube by a high pressure air hose or the like to clear out any of the jets 31 which may have become clogged by refuse.

In operation, the garbage chute according to the invention is normally constructed in stages as the building to which it is attached is built upwardly a floor at a time. Thus, initially, at for example the level of the second floor above the ground, a chute section 10 is attached by means of fastening the funnel portion 15 to any suitable overhanging building portion such as the balcony or the like, as shown in FIG. 1, and, by the use of any suitable hoisting apparatus (not shown) a tapered chute section 11 is then lowered into interlocking telescoping engagement with the upper end of chute section 10 until the abutments 23 engage the upper edges of section 10, thereby carrying the weight of section 11. A further section 12 may then be added by lowering the section 12 by the same hoisting apparatus until the lower end of section 12 telescopically interlocks with the upper end of section 11. The funnel portion 15 of section 12 will then be fastened to the next adjacent building portion on the next floor, i.e., the third floor, and so on as the building rises. Preferably, the water spray apparatus 30 is attached at or close to the lowermost section, as shown in FIG. 1, although obviously the water spray can be attached either to the tapered section or to the cylindrical section without affecting its operation. The operating cord 37 can similarly be extended upwardly as the building rises. When the building has been completed, and construction is finished the chute can then simply be removed by attaching a hoist to the top of the building and lifting the sections out one by one.

The foregoing is a description of a preferred embodiment of the invention which is given here by way of example only. The invention is not to be taken as limited to any of the specific features as described, but comprehends all such variations thereof as come within the scope of the appended claims.

I claim:

1. A sectional, dismountable, refuse chute for use on a building at a construction site or the like and comprising:
    a plurality of first tubular sheet metal chute sections, adapted to be supported directly on a building or the like; and having upper and lower ends of predetermined size;
    a plurality of second tubular sheet metal chute sections adapted to be supported upon respective said first chute sections and having lower ends dimensioned to fit within respective upper ends of said first chute sections, and said second chute sections having upper ends adapted to receive and fit around respective lower ends of adjacent first chute sections next thereabove;
    abutment means on the exterior of said second chute sections adjacent to their lower said ends and oriented to engage the upper ends of the respective next adjacent first chute sections and support the weight of said second sections on respective said first sections;
    hatchway means in at least some of said first sections for disposal of refuse therein;
    trap door means for said hatchway means; and
    funnel means for said hatchway means attached to respective said first sections exteriorly thereof in registration with said hatchways.

2. A refuse chute as claimed in claim 1 wherein at least said second chute sections are of generally frustoconical shape, and said first chute sections are of cylindrical shape, said sections being arranged and dimensioned whereby to permit the smaller ends of said frustoconical second sections to telescope loosely within said cylindrical first sections, and the larger ends thereof to telescope loosely exteriorly of said cylindrical sections.

3. A refuse chute as claimed in claim 1 wherein said trap door means is formed of flexible resilient material.

4. A refuse chute as claimed in claim 2 wherein said second chute sections are dimensioned with the lower ends adapted to make a tight wedging fit within said respective ends of said first sections a predetermined point along the length of said second sections, said abutment means being located to engage said respective upper ends just shot of said predetermined point.

5. A refuse chute as claimed in claim 1 including hoist attachment means fastened to the exterior of said first and second sections.

6. A refuse chute as claimed in claim 1 including water spray means arranged on one of said sections, and water spray operating means attached thereto and extending along the length of all said sections whereby to permit operation of said water spray by a workman at any of said hatchways along said chute.

7. A refuse chute as claimed in claim 1 wherein said funnel means is shaped and adapted to overlap and overlie an adjacent portion of a building under construction and support the weight of the respective said first chute section to which it is attached, and the second chute section next thereabove.

8. A refuse chute as claimed in claim 1 wherein said first and second sections are adapted to be arranged alternately, whereby to provide a continuous chute of adjustable length;
    trap door means attached to said sections for covering said hatchway means and being swingable in relation thereto to permit passage of refuse therethrough, and wherein said funnel means for said hatchway means is attached to respective said first sections exteriorly thereof around at least three sides of said hatchway means, said funnel means incorporating a generally flat floor portion and upstanding sidewalls, said funnel floor portion being arranged and oriented to overlie an adjacent portion of said building and being adapted to be attached to said building thereby supporting said chute first section in position, and supporting the next adjacent upper section chute section.

* * * * *